US008667000B2

(12) United States Patent
Ohnishi (10) Patent No.: US 8,667,000 B2
(45) Date of Patent: Mar. 4, 2014

(54) INFORMATION PROCESSING APPARATUS AND INFORMATION PROCESSING METHOD

(75) Inventor: Shinji Ohnishi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/484,997

(22) Filed: May 31, 2012

(65) Prior Publication Data

US 2013/0024485 A1   Jan. 24, 2013

(30) Foreign Application Priority Data

Jul. 19, 2011   (JP) .................................. 2011-158451

(51) Int. Cl.
  *G06F 7/00*   (2006.01)
(52) U.S. Cl.
  USPC ......................................................... 707/758
(58) Field of Classification Search
  USPC ......................................................... 707/758
  See application file for complete search history.

(56) References Cited

U.S. PATENT DOCUMENTS

2006/0007801 A1*  1/2006  Takashima ................. 369/44.27
2007/0022072 A1*  1/2007  Kao et al. ........................ 706/45

FOREIGN PATENT DOCUMENTS

JP         2002-288020        10/2002

* cited by examiner

*Primary Examiner* — Truong Vo
(74) *Attorney, Agent, or Firm* — Cowan, Liebowitz & Latman, P.C.

(57) ABSTRACT

An apparatus comprises a generation unit that newly generates a folder by a predetermined program; an association unit that associates the generated folder by the program other than the predetermined program with the predetermined program; a record unit that records management information, the management information being for identifying whether folders used by the predetermined program have been generated or associated; a selection unit that selects a desired folder from among the folders used by the predetermined program; an identification unit that identifies whether the selected folder has been generated or associated with reference to the information recorded in the memory; and a deletion control unit that performs control of when the selected folder is the generated folder, deleting the selected folder, and when the selected folder is the associated folder, cancelling the association without deleting the selected folder.

11 Claims, 11 Drawing Sheets

| ID | FOLDER PATH | ATTRIBUTE |
|---|---|---|
| 1 | C:¥User¥Folder1 | GENERATED |
| 2 | C:¥System¥Data | SELECTED |
| ⋮ | ⋮ | ⋮ |

FIG. 10

INFORMATION PROCESSING APPARATUS AND INFORMATION PROCESSING METHOD

BACKGROUND OF THE INVENTION

1. Field of the Invention

The present invention relates to a technique for managing information in units of folders.

2. Description of the Related Art

In general, digital video cameras that are currently prevalent record video data and other content data in a storage medium such as a built-in hard disk drive (HDD) and a memory card. Content data recorded in such a storage medium of digital cameras may be copied to a built-in HDD of a personal computer (PC) and an external HDD connected to the PC via, for example, a USB cable. A plurality of content data are managed as one group in units of folders. Japanese Patent Laid-Open No. 2002-288020 discloses a technique for managing a plurality of content files as a package in units of folders.

A content data management application software installed in PCs has functions of registering folder information of a folder to which content has been copied with a management unit, and deleting folder information of a folder that no longer needs to be managed from the management unit.

Examples of the function of registering folder information include: the function of newly generating and registering a folder for management in the HDD; and the function of selecting and registering a folder of content data copied in the HDD without using a video management application. Hereinafter, a folder generated by the application for registration is referred to as a "generated registration folder". On the other hand, a folder selected for registration is referred to as a "selected registration folder".

Examples of the function of deleting folder information include: the function of deleting a folder as well as content data in the folder from the HDD and deleting folder information from the management unit; and the function of deleting folder information from the management unit while leaving a folder and content data in the folder as-is. Hereinafter, processing for deleting a folder as well as content data in the folder from the HDD and deleting folder information from the management unit is referred to as "folder deletion". On the other hand, processing for deleting only folder information from the management unit while leaving a folder and content data in the folder as-is is referred to as "folder cancellation".

If the deletion processing is performed on a selected folder at the time of deleting folder information, the following inconvenience may arise. For example, in a case where content data is copied in a special folder used by an operating system (OS) of a PC, if the user performs the folder deletion processing with the selection of the special folder, then folders and files necessary for the OS to operate normally are deleted.

SUMMARY OF THE INVENTION

The present invention has been made in consideration of the aforementioned problems, and realizes a technique for controlling, in accordance with management information of a folder, whether to perform the deletion processing only on the management information, or to perform the deletion processing on both the management information and the folder itself.

In order to solve the aforementioned problems, the present invention provides an information processing apparatus comprising: a generation unit configured to newly generate a folder in a storage medium by control based on a predetermined program; an association unit configured to, in order for the predetermined program to use a folder generated in the storage medium by control based on a program other than the predetermined program, associate the folder generated in the storage medium by the control based on the program other than the predetermined program with the predetermined program; a record unit configured to record management information in a memory, the management information being for identifying whether folders used by the predetermined program have been generated by the generation unit or associated by the association unit; a selection unit configured to select a desired folder from among the folders used by the predetermined program; an identification unit configured to identify whether the folder selected by the selection unit has been generated by the generation unit or associated by the association unit with reference to the information recorded in the memory; and a deletion control unit configured to perform control of when the identification unit has identified the folder selected by the selection unit as having been generated by the generation unit, deleting the selected folder from the storage medium, and when the identification unit has identified the selected folder as having been associated by the association unit, cancelling the association without deleting the selected folder from the storage medium.

In order to solve the aforementioned problems, the present invention provides an information processing method comprising: a generation step of newly generating a folder in a storage medium by control based on a predetermined program; an association step of, in order for the predetermined program to use a folder generated in the storage medium by control based on a program other than the predetermined program, associating the folder generated in the storage medium by the control based on the program other than the predetermined program with the predetermined program; a record step of recording management information in a memory, the management information being for identifying whether folders used by the predetermined program have been generated by the generation step or associated by the association step; a selection step of selecting a desired folder from among the folders used by the predetermined program; an identification step of identifying whether the folder selected by the selection step has been generated by the generation step or associated by the association step with reference to the information recorded in the memory; and a deletion control step of performing control of when the identification step has identified the folder selected by the selection step as having been generated by the generation step, deleting the selected folder from the storage medium, and when the identification step has identified the selected folder as having been associated by the association step, cancelling the association without deleting the selected folder from the storage medium.

According to the present invention, it is possible to control, in accordance with management information of a folder, whether to perform the deletion processing only on the management information, or to perform the deletion processing on both the management information and the folder itself.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An information processing apparatus of the present invention is realized by a personal computer (PC). Processing is performed by a content data management application (hereinafter, "management application") installed on the PC.

<Configuration of Information Processing Apparatus>

Figure 1A:
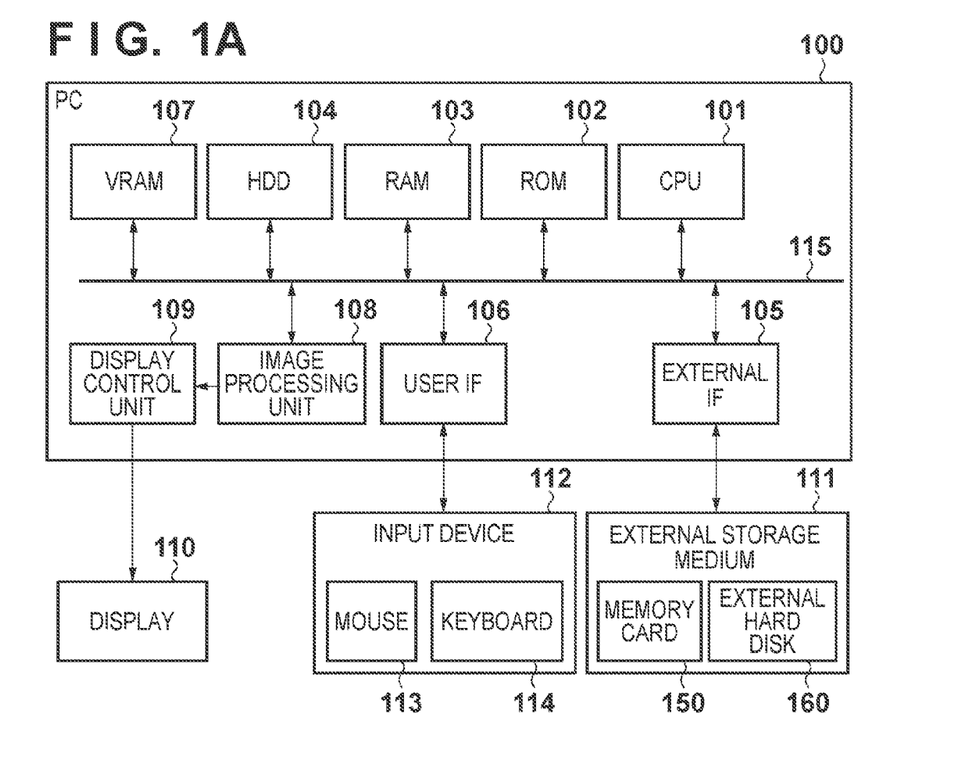
FIG. 1A is a block diagram of an information processing apparatus according to an embodiment of the present invention.

A description is now given of a configuration of an information processing apparatus according to the present embodiment with reference to FIG. 1A.

As shown in FIG. 1A, a PC 100 includes a central processing unit (CPU) 101, a read-only memory (ROM) 102, and a random-access memory (RAM) 103. The ROM 102 stores a control program in which a processing procedure of the CPU 101 is described. Serving as a work memory, the RAM 103 temporarily stores a control program and data. The PC 100 also includes a hard disk drive (HDD) 104 that stores programs, such as various types of applications and an operating system (OS), and data. The PC 100 further includes an external interface (IF) 105 for connecting to an external storage medium 111. Examples of the external storage medium 111 include a memory card 150, such as a CompactFlash (registered trademark), and an external HDD 160.

The PC 100 also includes a user IF 106 that receives and processes information input from an input device 112. Examples of the input device 112 include a mouse 113 and a keyboard 114. The PC 100 further includes a video random-access memory (VRAM) 107, an image processing unit 108, a display control unit 109, and a display 110 such as a liquid crystal display (LCD) panel. The VRAM 107 stores data of images to be displayed on the display 110.

The above blocks are connected to an internal bus 115 which is a channel for control signals and data signals.

<Structure of Data and Folders in Memory Card>

Figure 1B:
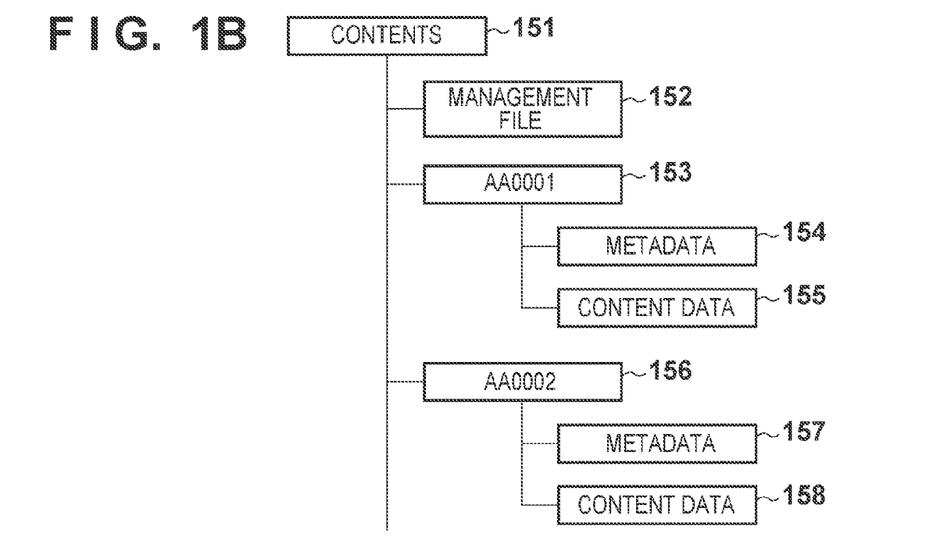
FIG. 1B shows an example of the structure of data and folders in a memory card according to an embodiment of the present invention.

Next, a description is given of the structure of data and folders recorded in the memory card with reference to FIG. 1B.

When the memory card 150 is reset in a video camera and the like, data and folders having a predetermined structure shown in FIG. 1B as one example are generated in the storage medium. As shown in FIG. 1B, a CONTENTS folder 151 is generated immediately under the root, and a management file 152 is generated in the CONTENTS folder 151. Management information of content data stored in the CONTENTS folder 151 is recorded in the management file 152.

When content data is recorded using a video camera and the like, a folder is generated for every content. Folders 153 and 156, which are respectively named "AA0001" and "AA0002", are generated for different contents. These names are used as content IDs for uniquely identifying content data. The folders store files 154 and 157 together with content data 155 and 158. Metadata of the content data is recorded in the files 154 and 157.

<Application Screen>

Figure 2:
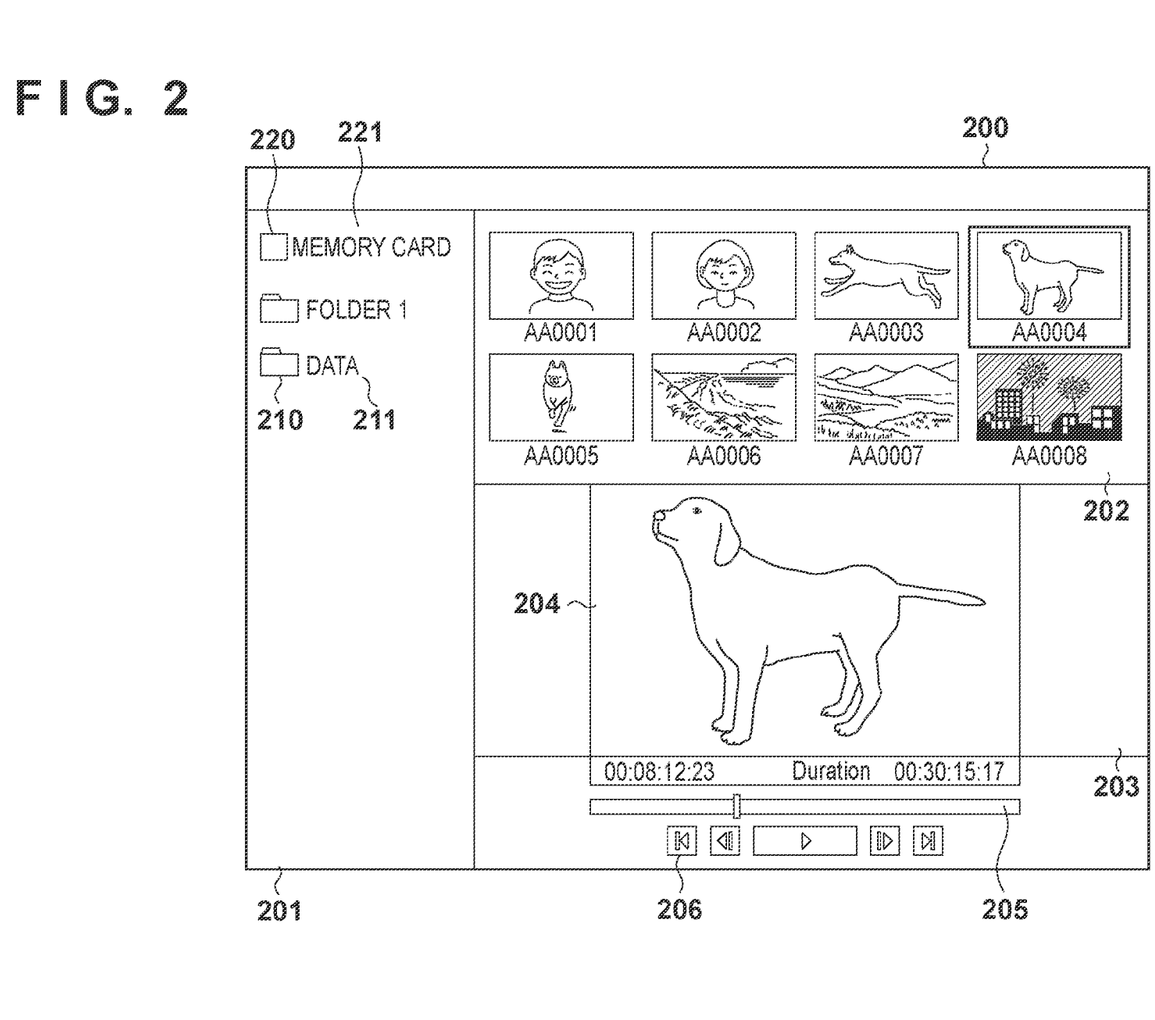
FIG. 2 shows an example of the configuration of a GUI screen of a content data management application.

The following describes a graphical user interface (GUI) screen displayed by the management application according to the present embodiment with reference to FIG. 2.

As shown in FIG. 2, a GUI screen 200 includes a folder pane 201 that shows folders managed by the management application. The GUI screen 200 also includes a content pane 202 and a preview pane 203. The content pane 202 shows a list of content data recorded in a folder selected in the folder pane 201. The preview pane 203 shows content selected in the content pane 202.

The folder pane 201 shows folder icons 210 and folder names 211 as link information for accessing the folders managed by the management application. When the memory card 150 in which content data is recorded is connected to the PC 100, the folder pane 201 shows medium information of the memory card 150. An icon 220 and a memory card name 221 of the memory card 150 are shown as link information of the memory card 150. The above link information is associated with the paths of folders that actually store content data (the record location information indicating locations where the folders are recorded) to allow usage by the management application. The management application records folder information in the management file so as to keep the above link information stored after the power of the PC 100 is turned off.

Figure 3:
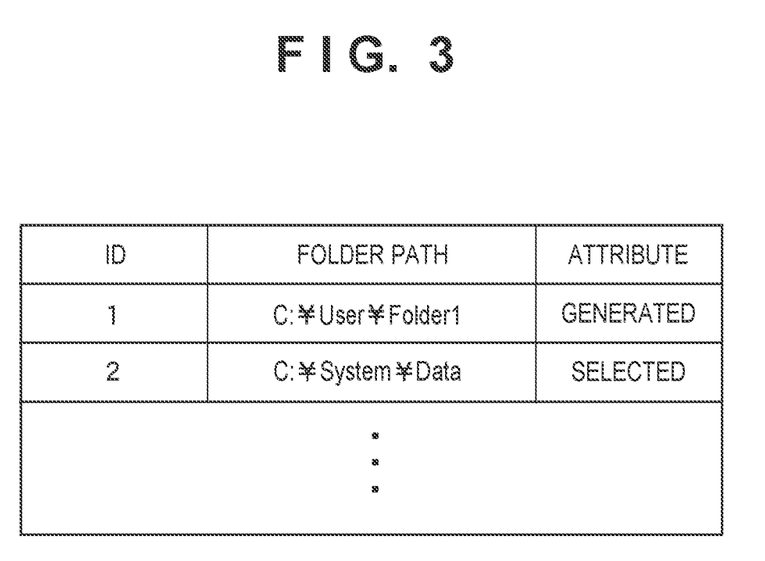
FIG. 3 shows an example of the structure of a management folder database.

The folder information is written to a management folder database (DB) shown in FIG. 3 when newly generated or when changed. The management folder DB is used to manage the folder information of the folders managed by the management application, and is generated in the HDD 104 as a file. Every folder information includes an ID and a folder path of a management folder, together with attribute information indicating whether the management folder is a "generated registration folder" or "selected registration folder".

<Folder Management Processing>

Figure 4:
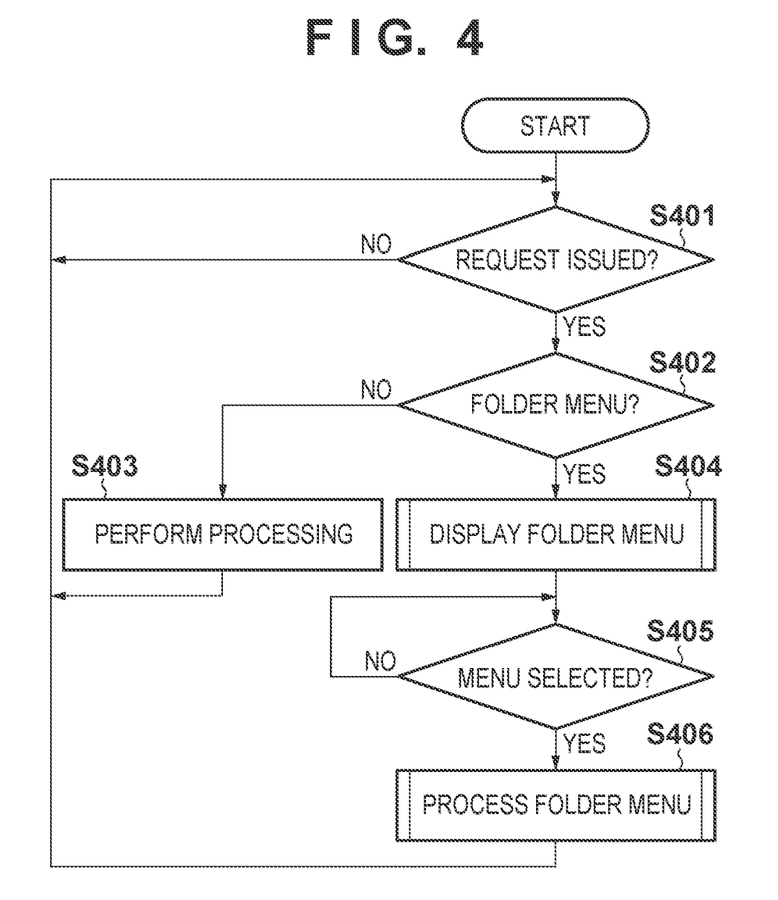
FIG. 4 is a flowchart for explaining operations of the content data management application.

A description is now given of folder management processing performed by the management application according to the present embodiment with reference to a flowchart of FIG. 4.

Referring to FIG. 4, once the management application is activated, the CPU 101 reads out folder information from the management folder DB and displays the GUI screen 200 shown in FIG. 2 on the display 110.

In step S401, a determination is made as to whether or not a request has been issued with respect to the management application due to the user performing an operation on the displayed GUI screen 200 using the input device 112. When the request has been issued with respect to the management application due to the user operation, a determination is made in step S402 as to whether or not the issued request is a menu display request with respect to a folder. When the issued request is not a menu display request with respect to a folder, processing corresponding to the issued request is performed in step S403, and the processing returns to step S401.

Figure 5:
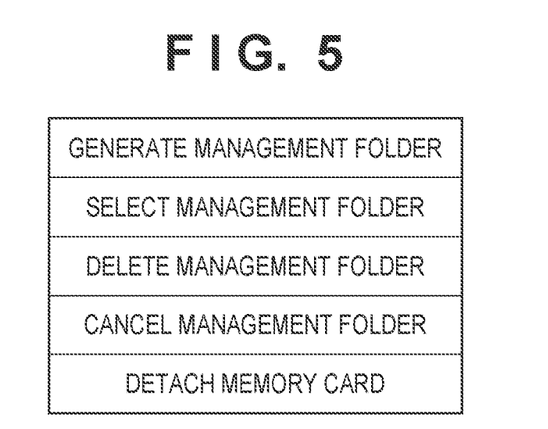
FIG. 5 shows an example of the structure of a folder menu.

When the issued request is determined to be a menu display request with respect to a folder in step S401, a folder menu is displayed in step S404. FIG. 5 shows one example of the folder menu displayed in step S404. According to this example, five menu items are displayed. "Generate Management Folder" is to instruct execution of a function of newly generating and registering a folder for management in the HDD 104. "Select Management Folder" is to instruct execution of a function of selecting and registering a folder of content data copied in the HDD 104 without using the management application.

"Delete Management Folder" is to instruct execution of a function of deleting the corresponding folder as well as content data therein from the HDD 104, and deleting the folder information thereof from the management folder DB. "Cancel Management Folder" is to instruct execution of processing for leaving the corresponding folder as well as content data therein as-is, and deleting the folder information thereof from the management folder DB. "Detach Memory Card" is to instruct execution of a function of cancelling the connection between the PC 100 and the memory card 150 so that the user can detach the memory card 150. Specifics of the menu display processing in step S404 will be described later.

In step S405, the processing waits for the user operation with the input device 112 to select one of the menu items from the folder menu of FIG. 5, which is displayed in step S404. In step S406, processing corresponding to the selected menu item is performed. Specifics of the processing in step S406 will be described later.

<Folder Menu Display Processing (S404 in FIG. 4)>

Figure 6:
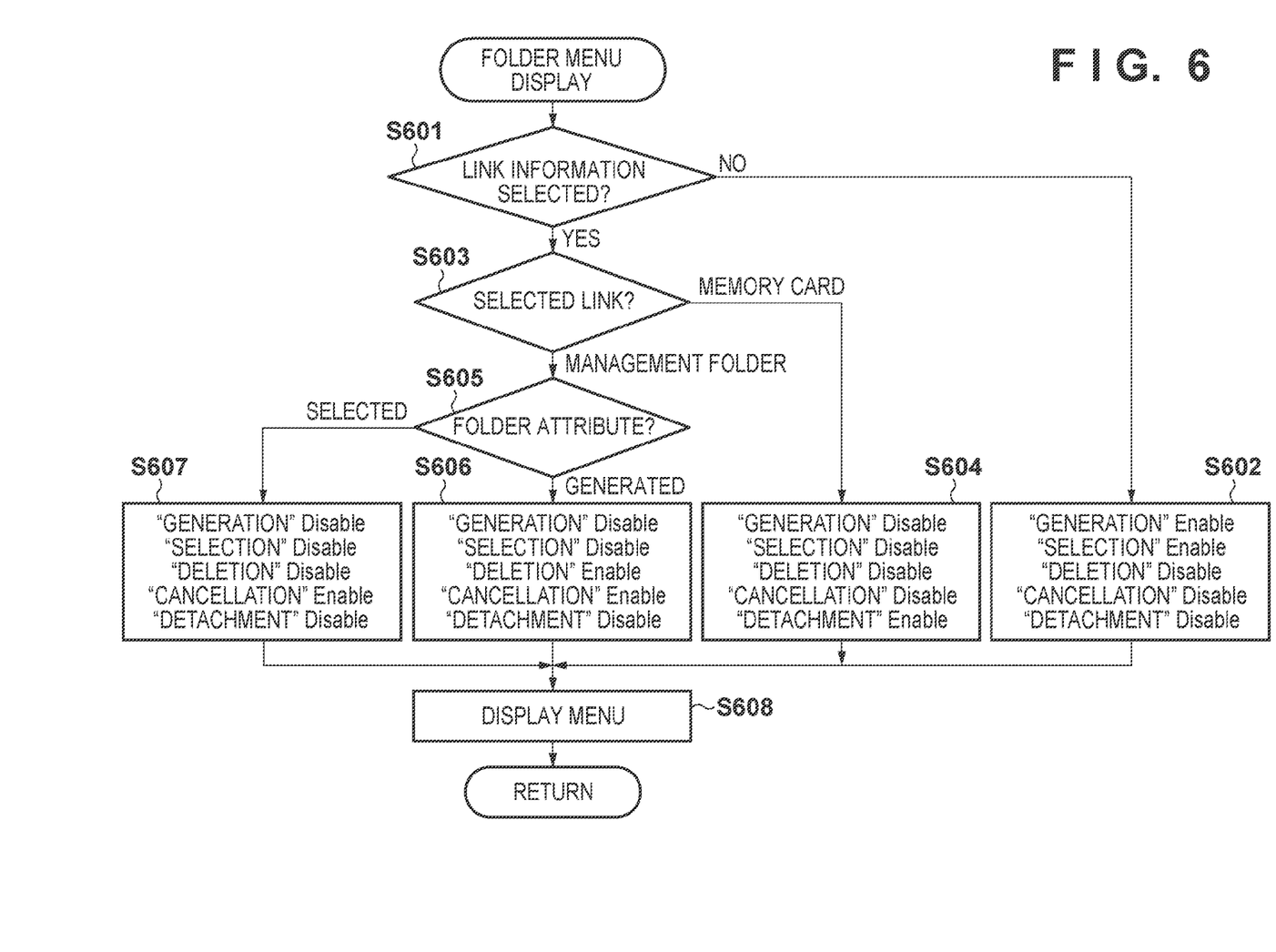
FIG. 6 is a flowchart of folder menu display processing.

Next, a description is given of the folder menu display processing of step S404 in FIG. 4 with reference to a flowchart of FIG. 6. Note that "Generation", "Selection", "Deletion", "Cancellation", and "Detachment" in steps S602, S604, S606, and S607 of FIG. 6 respectively correspond to "Generate Management Folder", "Select Management Folder", "Delete Management Folder", "Cancel Management Folder", and "Detach Memory Card" of the folder menu shown in FIG. 5. In addition, "Enable" indicates that the corresponding menu item is valid (the state in which the corresponding menu item is selectable by the user), whereas "Disable" indicates that the corresponding menu item is invalid (the state in which the corresponding menu item is not selectable by the user).

Figure 7:
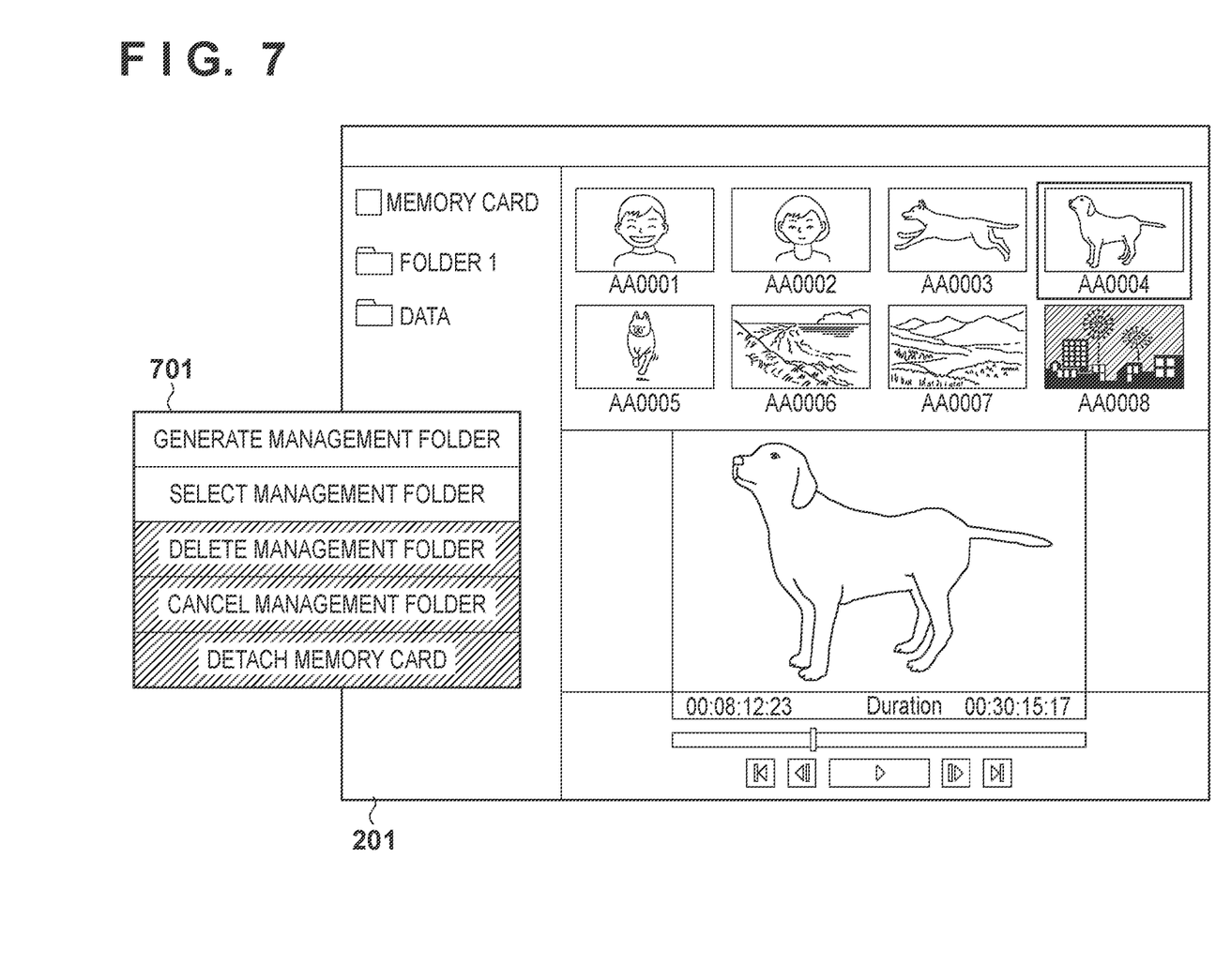
FIG. 7 shows an example in which a folder menu is displayed with no link information selected in a folder pane.

Referring to FIG. 6, a determination is made in step S601 as to whether or not a selection is being made of any link information shown in the folder pane 201 of FIG. 2 when the menu display request for a folder is detected. When the menu display request is detected with no link information selected, a display status of the menu items is set in step S602, and menu display is performed in step S608 based on the settings of step S602. FIG. 7 shows an example in which a folder menu is displayed with no link information selected in the folder pane 201. The displayed menu is labeled 701. Menu items displayed with a white background are selectable by the user. On the other hand, menu items displayed with a gray background are not selectable. With no selection of link information targeted for processing, "Delete Management Folder", "Cancel Management Folder", and "Detach Memory Card", which are targeted for specific link information, are not selectable. Hence, only "Generate Management Folder" and "Select Management Folder" for newly registering a management folder are selectable.

Figure 8:
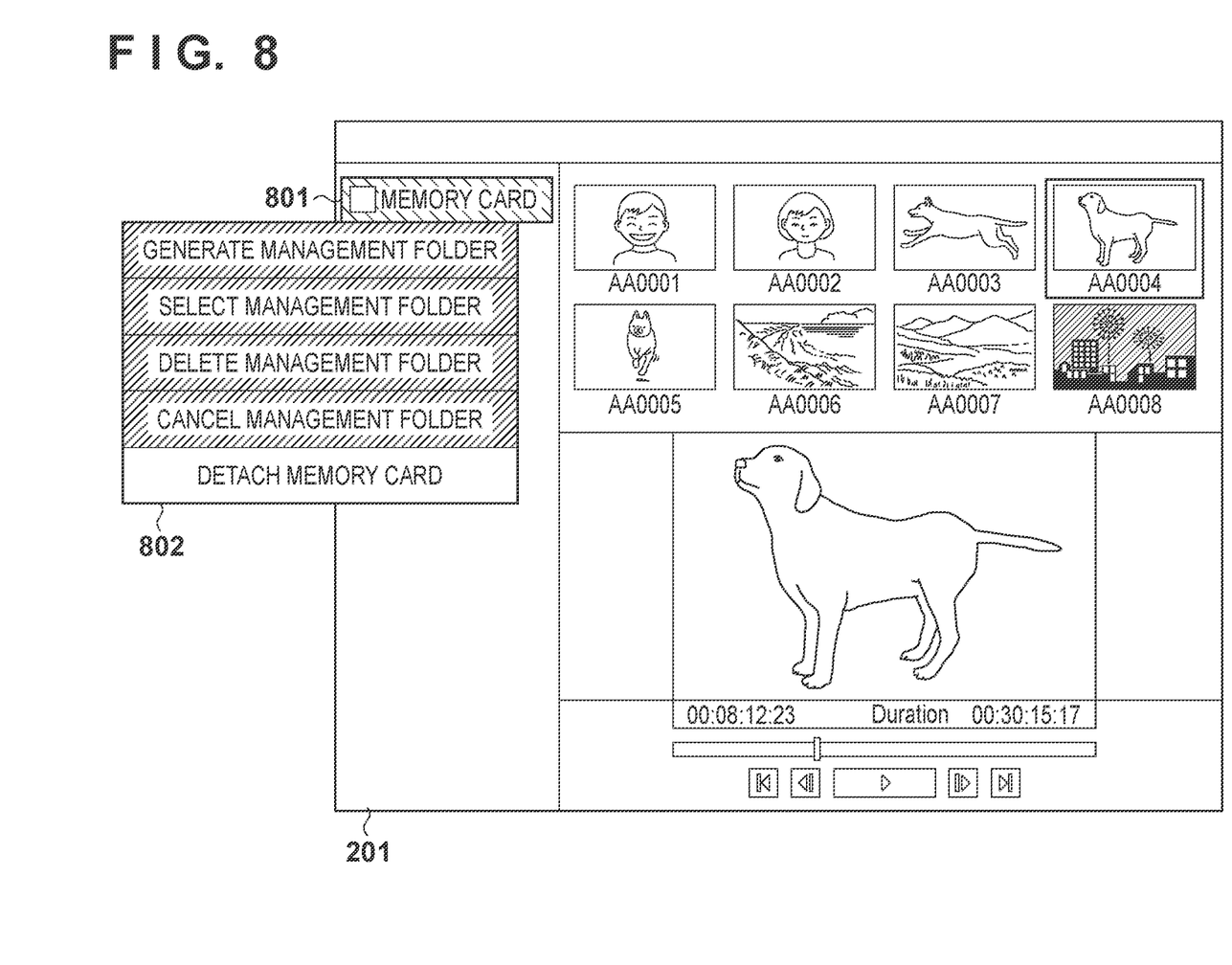
FIG. 8 shows an example in which a folder menu is displayed while link information of a memory card is selected in the folder pane.

When any link information is selected in step S601, a determination is made in step S603 as to whether the selected link information corresponds to a management folder or the memory card 150. When the selected link information corresponds to the memory card 150, a display status of the menu items is set in step S604, and menu display is performed in step S608 based on the settings of step S604. FIG. 8 shows an example in which a folder menu is displayed while the link information of the memory card is selected in the folder pane 201. A menu 802 is the folder menu displayed while link information 801 of the memory card 150 is selected. Since the memory card 150 is targeted for processing, "Generate Management Folder", "Select Management Folder", "Delete Management Folder", and "Cancel Management Folder", which are processing for a management folder, are not selectable. That is, only "Detach Memory Card" is selectable.

Figure 9:
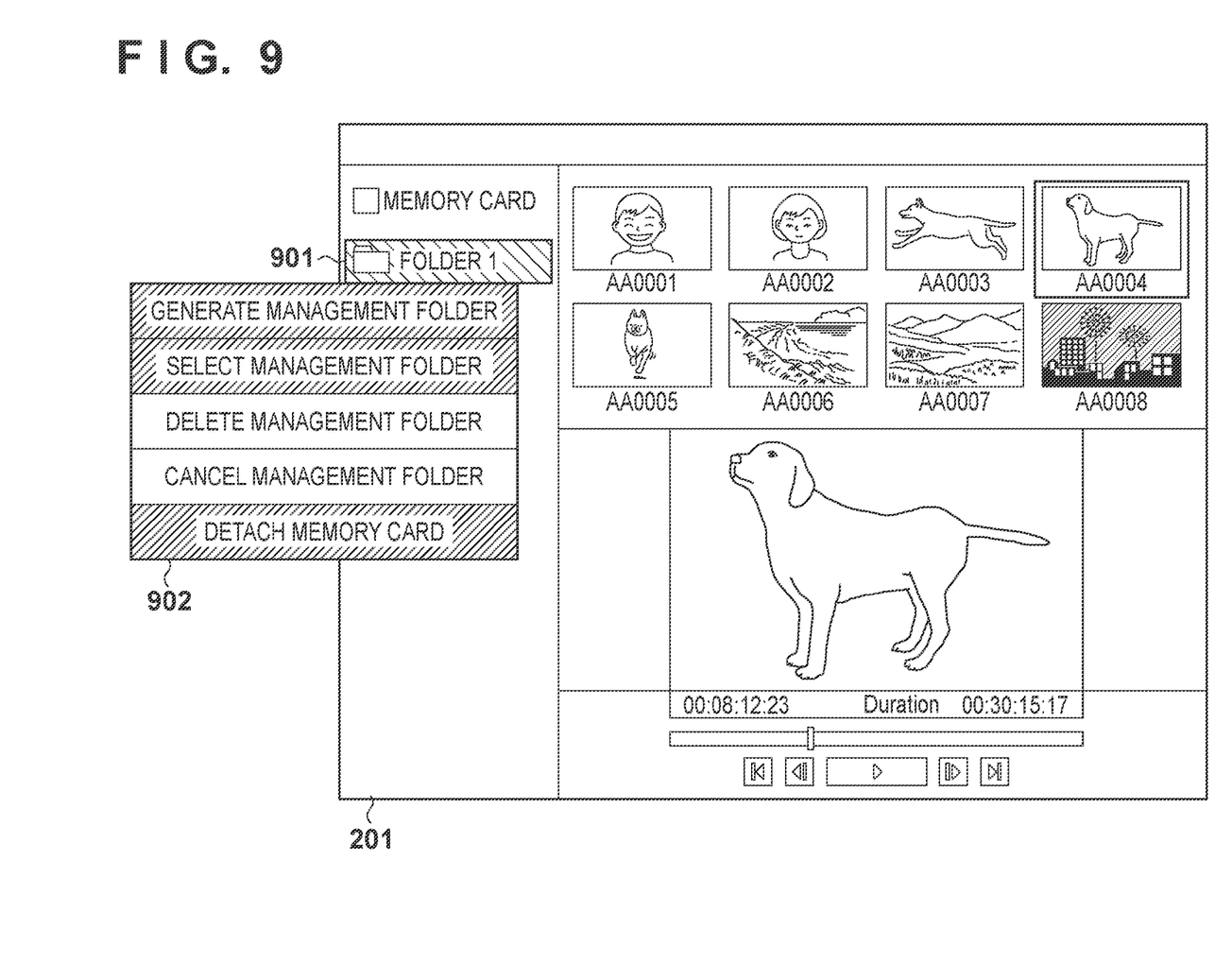
FIG. 9 shows an example in which a folder menu is displayed while link information of a generated registration folder is selected in the folder pane.

When the selected link information corresponds to a management folder in step S603, a determination is made in step S605 as to whether the management folder corresponding to the selected link information is the "generated registration folder" or "selected registration folder" based on its attribute information in the management folder DB. When the management folder is determined to be the "generated registration folder" in step S605, a display status of the menu items is set in step S606, and menu display is performed in step S608 based on the settings of step S606. FIG. 9 shows an example in which a folder menu is displayed while the link information of a generated registration folder is selected in the folder pane 201. A menu 902 is the folder menu displayed while link information 901 of a generated registration folder is selected. Since the generated registration folder is targeted for processing, "Generate Management Folder" and "Select Management Folder", which are processing for newly registering a management folder, and "Detach Memory Card" are not selectable. Hence, only "Delete Management Folder" and "Cancel Management Folder" are selectable. Here, the management folder targeted for processing is a folder newly generated by the management application. Therefore, for example, files necessary for operations of the OS are not recorded under the target folder. As deletion of folders and files under the management folder does not affect the operations of the system, "Delete Management Folder" is displayed in a selectable manner.

Figure 10:
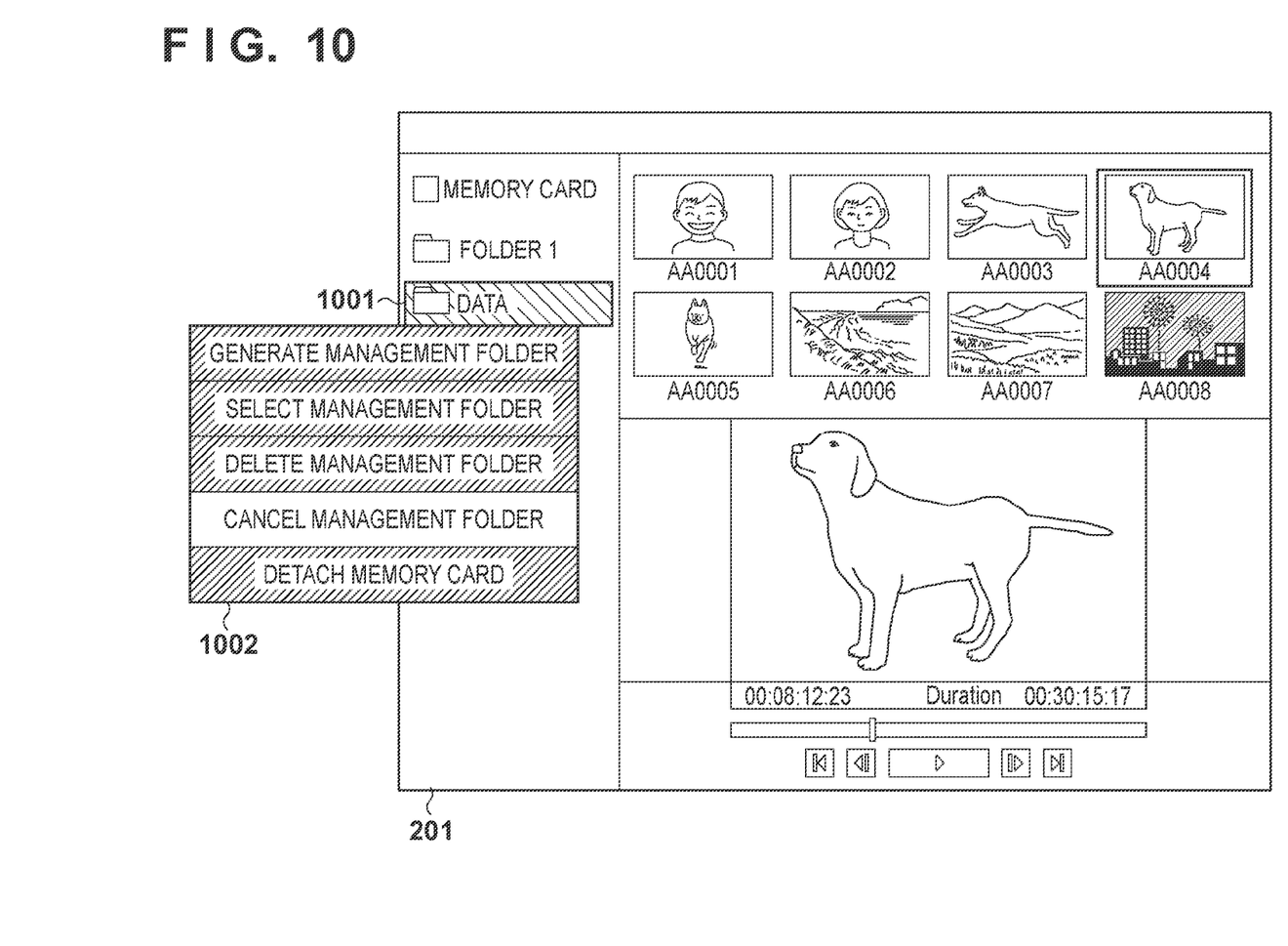
FIG. 10 shows an example in which a folder menu is displayed while link information of a selected registration folder is selected in the folder pane.

When the management folder is determined to be the "selected registration folder" in step S605, a display status of the menu items is set in step S607. In step S608, menu display is performed based on the settings of step S607. FIG. 10 shows an example in which a folder menu is displayed while the link information of a selected registration folder is selected in the folder pane 201. A menu 1002 is the folder menu displayed while link information 1001 of a selected registration folder is selected. Since the selected registration folder is targeted for processing, "Generate Management Folder" and "Select Management Folder", which are processing for newly registering a management folder, and "Detach Memory Card" are not selectable. On the other hand, "Cancel Management Folder" is selectable. Here, the management folder targeted for processing is not a folder newly generated by the management application, but is a folder in which content is copied by the user without using the management application. The selected registration folder may be a special folder in which, for example, files necessary for operations of the OS are stored. Therefore, deletion of folders and files under the management folder may affect the operations of the system. For this reason, "Delete Management Folder" is displayed in an unselectable manner.

<Folder Menu Processing (S406 in FIG. 4)>

Figure 11:
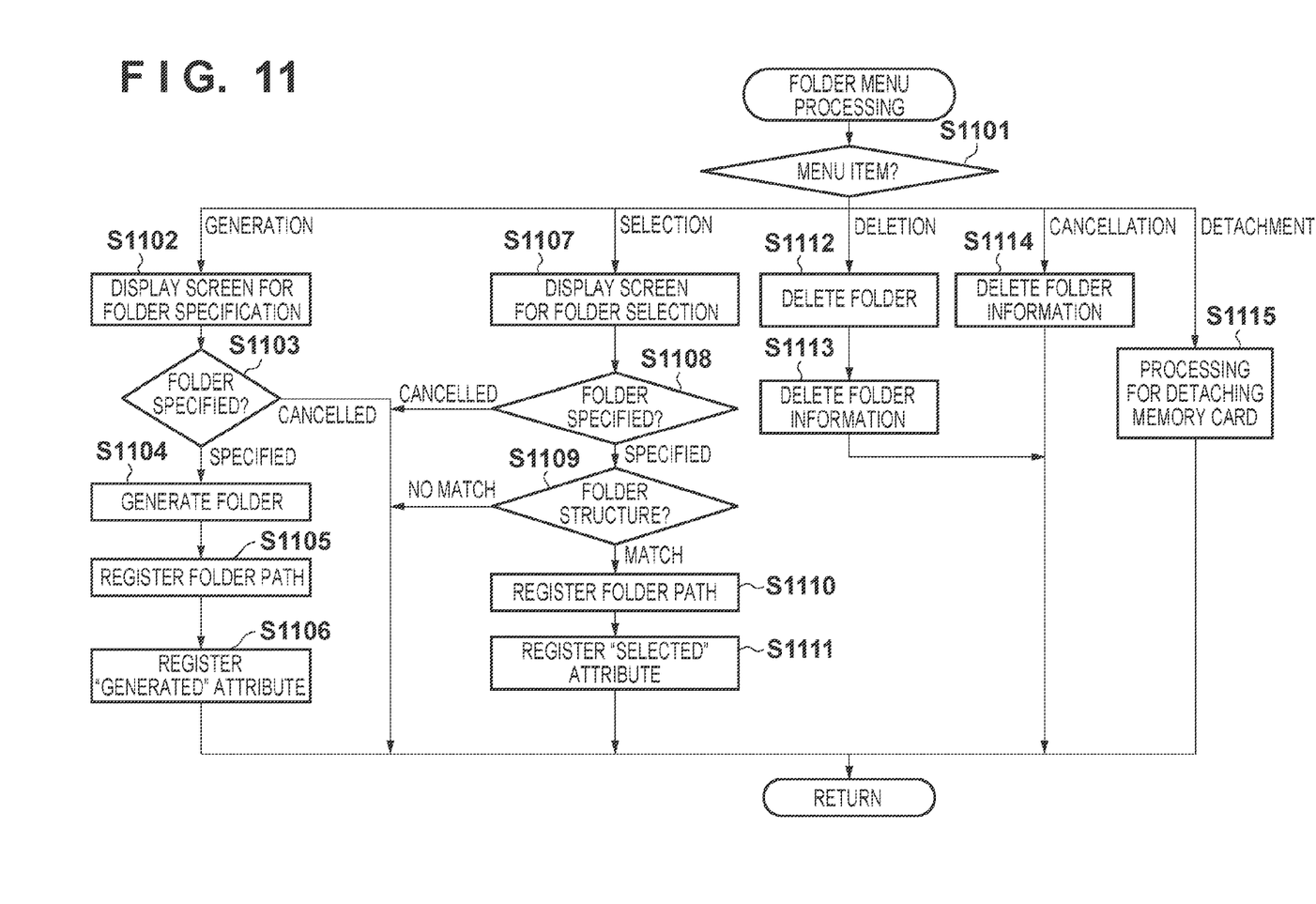
FIG. 11 is a flowchart of folder menu processing according to the first embodiment.

The following describes the folder menu processing of step S406 in FIG. 4 with reference to a flowchart of FIG. 11.

Referring to FIG. 11, in step S1101, a determination is made as to the menu item selected in step S405. When the result of the determination in step S1101 is "Generate Management Folder", a screen for specifying a folder in which a management folder is to be newly generated and the name of the folder to be newly generated is displayed in step S1102. In step S1103, a determination is made as to whether or not the folder and the name are specified on the displayed screen for folder specification. When the folder specification is cancelled, the processing returns to step S401 of FIG. 4.

When the folder and the name are specified, folder generation processing is performed in step S1104 whereby a subfolder with the specified name is generated in the specified folder. Furthermore, a CONTENTS folder 151 and a management file 152 shown in FIG. 1B are generated in the subfolder. For example, provided the specified folder and the specified name are respectively "C:¥User" and "Folder2", a folder "C:¥User¥Folder2" is newly generated as a management folder. In addition, a CONTENTS folder and a management file are generated in "C:¥User¥Folder2".

Management information generation processing is performed in step S1105 whereby a management folder ID is newly generated and a path of the generated management folder is registered in the management folder DB. Folder registration processing is performed in step S1106 whereby first attribute information indicating "generated registration folder" is registered as attribute information corresponding to the management folder ID. Although information indicating that a folder is newly generated is registered and managed in the present example, information indicating that a folder is registered may be registered and managed instead.

When the folder information is registered through the above-described generation of a management folder, the folder is newly generated by the management application as has been explained earlier. This newly generated folder does not store, for example, files used by the OS and other applications. Therefore, deletion of the folder as well as folders and files therein does not affect operations of the system. For this reason, when the selected link information corresponds to the generated registration folder, display is performed with "Delete Management Folder" of the folder menu being valid in step S606 of FIG. 6.

When the result of the determination in step S1101 is "Select Management Folder", a screen for selecting a folder in the HDD 104 is displayed in step S1107. In step S1108, a determination is made as to whether or not a folder has been selected on the displayed screen for folder selection. When the folder selection is cancelled, the processing returns to step S401 of FIG. 4. When a folder has been selected, the processing moves to step S1109 in which the structure of the selected folder is checked so as to determine whether or not this structure matches the structure involving the CONTENTS folder 151 and the management file 152 shown in FIG. 1B. When they do not match, it means that the selected folder does not have the structure of folders managed by the management application; therefore, the registration is cancelled and the processing returns to step S401 of FIG. 4.

When they match, management information generation processing is performed in step S1110 whereby a management folder ID is newly generated and a path of the selected management folder is registered in the management folder DB. Folder registration processing is performed in step S1111 whereby second attribute information indicating "selected registration folder" is registered as attribute information corresponding to the management folder ID. Subsequently, the management folder selection processing is ended.

When the folder information is registered through selection of a management folder, the management application registers a folder existing in the HDD 104 as has been explained earlier. This selected folder may store, for example, files used by the OS and files necessary for operations of other applications. Hence, deletion of the folder as well as folders and files therein may affect operations of the system. For this reason, when the selected link information corresponds to the selected registration folder, display is performed with "Delete Management Folder" of the folder menu being invalid in step S607 of FIG. 6.

When the result of the determination in step S1101 is "Delete Management Folder", folder deletion processing is performed in step S1112 whereby the selected management folder as well as folders and files therein are deleted from the HDD 104. Following that, folder information deletion processing is performed in step S1113 whereby the corresponding folder information is deleted from the management folder DB.

When the result of the determination in step S1101 is "Cancel Management Folder", folder information cancellation processing is performed in step S1114. Specifically, in step S1114, the selected management folder as well as folders and files therein are not deleted from the HDD 104, but the corresponding folder information is deleted from the management folder DB.

When the result of the determination in step S1101 is "Detach Memory Card", processing for detaching the system from the target memory card is performed in step S1115 so that the user can physically detach the target memory card from the PC 100.

As has been described above, processing for deleting folder information can be controlled by registering attribute information indicating that a folder is newly generated, or attribute information indicating that an existing folder has been selected, as the folder information. This makes it possible to control processing for deleting folder information that may affect the system operations.

Second Embodiment

Figure 12:
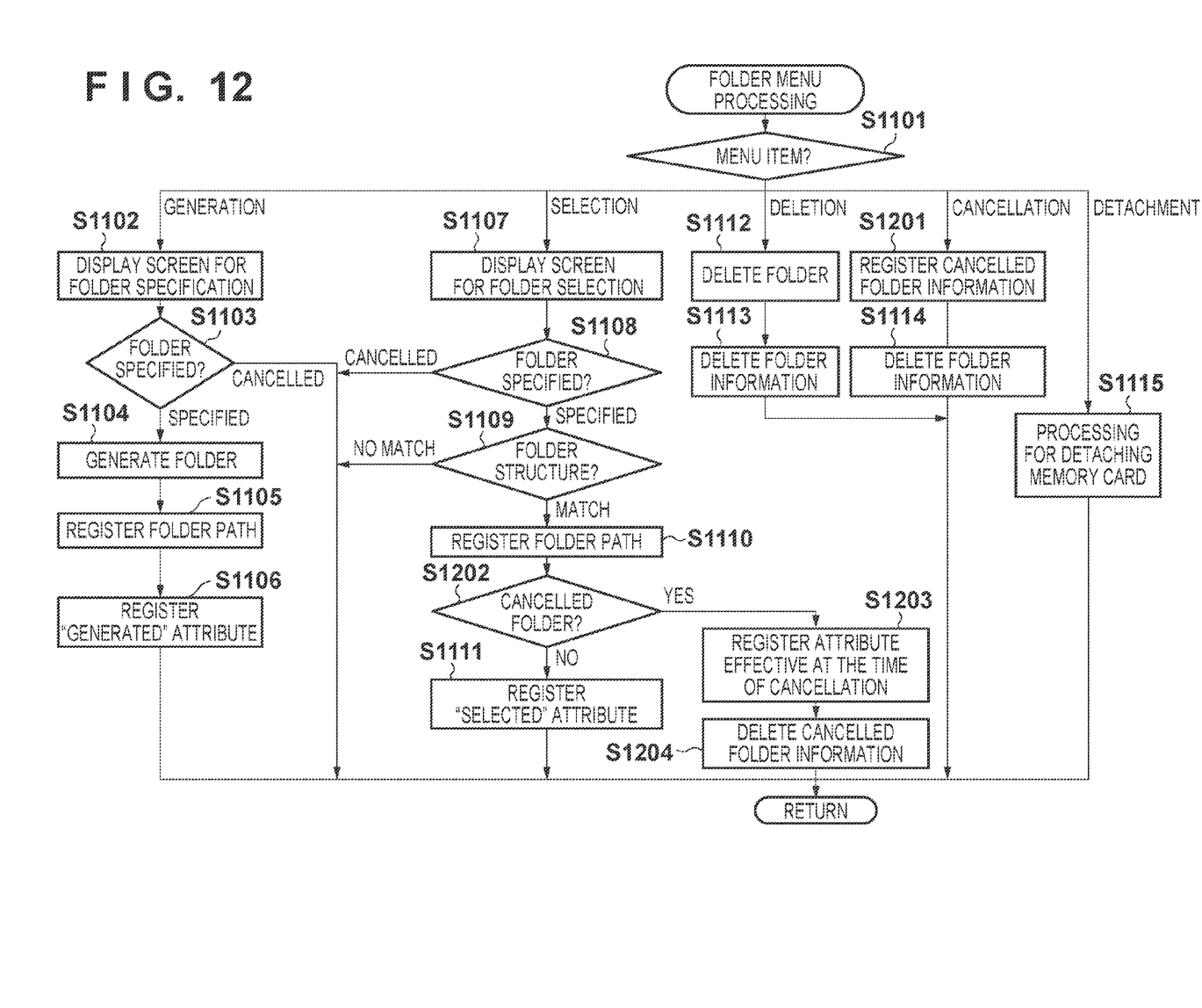
FIG. 12 is a flowchart of folder menu processing according to the second embodiment.

A description is now given of folder menu processing according to the second embodiment with reference to a flowchart of FIG. 12.

FIG. 12 is a flowchart of the folder menu processing in step S406 of FIG. 4. The steps in FIG. 12 that are given the same reference signs as in the flowchart of FIG. 11 are similar to the operations described in the first embodiment. A description thereof is thus omitted below.

Referring to FIG. 12, when the result of the determination in step S1101 is "Cancel Management Folder", the processing moves to step S1201 in which a folder path and attribute information of the selected management folder are recorded in a cancelled folder DB as cancelled folder information. The cancelled folder DB is generated in the HDD 104 as a file. As with the management folder DB shown in FIG. 3, every cancelled folder information includes an ID and a folder path of a cancelled folder, together with attribute information indicating whether the cancelled folder is a "generated registration folder" or "selected registration folder". After the cancelled folder information is registered, the selected management folder as well as folders and files therein are not deleted from the HDD 104. In step S1114, the corresponding folder information is deleted from the management folder DB.

When the result of the determination in step S1101 is "Select Management Folder", information of a folder path of the selected folder is registered with the management folder DB in step S1110. Following that, a determination is made in step S1202 as to whether or not the registered folder path is recorded in the cancelled folder DB as cancelled folder information. When not recorded, the processing moves to step S1111 in which second attribute information indicating "selected registration folder" is registered as attribute information corresponding to the management folder ID. When recorded, the processing moves to step S1203 in which the attribute information recorded as the cancelled folder information (deletion information) is recorded as the attribute information of the folder information. Thereafter, in step S1204, the cancelled folder information is deleted from the cancelled folder DB.

As set forth above, in a case where processing for cancelling a management folder is performed after the folder information indicating "generated registration folder" is registered, should the cancelled folder be registered again, the attribute information that was effective at the time of cancellation, namely "generated", is registered again. The deletion processing cannot be performed on a management folder that is registered through the management folder selection processing. However, in a case where registration of a management folder generated by the management application has been cancelled, should the management folder be registered again, the deletion processing can be performed on the management folder.

The present embodiment has described an example in which, when performing the processing for cancelling a management folder, the processing for registering the cancelled folder information is performed for all management folders. However, similar effects can be achieved even if the processing for registering the cancelled folder information is performed only for management folders whose attribute information indicates "generated".

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-158451, filed Jul. 19, 2011, which is hereby incorporated by reference herein in its entirety.

What is claimed is:

1. An information processing apparatus comprising:
a generation unit configured to newly generate a folder in a storage medium by control based on a predetermined program;
an association unit configured to, in order for the predetermined program to use a folder generated in the storage medium by control based on a program other than the predetermined program, associate the folder generated in the storage medium by the control based on the program other than the predetermined program with the predetermined program;
a record unit configured to record management information in a memory, the management information being for identifying whether folders used by the predetermined program have been generated by the generation unit or associated by the association unit;
a selection unit configured to select a desired folder from among the folders used by the predetermined program;
an identification unit configured to identify whether the folder selected by the selection unit has been generated by the generation unit or associated by the association unit with reference to the information recorded in the memory; and
a deletion control unit configured to perform control of when the identification unit has identified the folder selected by the selection unit as having been generated by the generation unit, deleting the selected folder from the storage medium, and when the identification unit has identified the selected folder as having been associated by the association unit, cancelling the association without deleting the selected folder from the storage medium.

2. The apparatus according to claim 1, wherein
the management information includes first attribute information indicating that a folder has been newly generated by the generation unit, and
when the management information corresponding to the folder selected by the selection unit includes the first attribute information, the deletion control unit deletes the selected folder from the storage medium and deletes the management information corresponding to the selected folder.

3. The apparatus according to claim 1, wherein
the management information includes second attribute information indicating that a folder has been associated by the association unit, and
when the management information corresponding to the folder selected by the selection unit includes the second attribute information, the deletion control unit does not delete the selected folder from the storage medium but deletes the management information corresponding to the selected folder.

4. The apparatus according to claim 1, wherein
the management information includes deletion information indicating that a folder has been deleted by the deletion control unit, and
when the management information includes the deletion information corresponding to a folder to be generated by the generation unit, the record unit records management information effective at the time of deleting the folder again.

5. The apparatus according to claim 4, wherein when a folder that has been deleted by the deletion control unit is to be generated again by the generation unit, the record unit deletes the deletion information corresponding to the folder to be generated again from the memory.

6. An information processing method comprising:
a generation step of newly generating a folder in a storage medium by control based on a predetermined program;
an association step of, in order for the predetermined program to use a folder generated in the storage medium by control based on a program other than the predetermined program, associating the folder generated in the storage medium by the control based on the program other than the predetermined program with the predetermined program;
a record step of recording management information in a memory, the management information being for identifying whether folders used by the predetermined program have been generated by the generation step or associated by the association step;
a selection step of selecting a desired folder from among the folders used by the predetermined program;
an identification step of identifying whether the folder selected by the selection step has been generated by the generation step or associated by the association step with reference to the information recorded in the memory; and
a deletion control step of performing control of when the identification step has identified the folder selected by the selection step as having been generated by the generation step, deleting the selected folder from the storage medium, and when the identification step has identified the selected folder as having been associated by the association step, cancelling the association without deleting the selected folder from the storage medium.

7. The method according to claim 6, wherein
the management information includes first attribute information indicating that a folder has been newly generated by the generation step, and
when the management information corresponding to the folder selected by the selection step includes the first attribute information, the deletion control step deletes the selected folder from the storage medium and deletes the management information corresponding to the selected folder.

8. The method according to claim 6, wherein
the management information includes second attribute information indicating that a folders has been associated by the association step, and
when the management information corresponding to the folder selected by the selection step includes the second attribute information, the deletion control step does not delete the selected folder from the storage medium but deletes the management information corresponding to the selected folder.

9. The method according to claim 6, wherein
the management information includes deletion information indicating that a folder has been deleted by the deletion control step, and
when the management information includes the deletion information corresponding to a folder to be generated by the generation step, the record step records management information effective at the time of deleting the folder again.

10. The method according to claim 9, wherein
when a folder that has been deleted by the deletion control step is to be generated again by the generation step, the record step deletes the deletion information corresponding to the folder to be generated again from the memory.

11. A computer-readable storage medium storing a program for causing a computer to execute the information processing method according to claim 6.

* * * * *